United States Patent

Kota et al.

[11] Patent Number: 5,976,603
[45] Date of Patent: Nov. 2, 1999

[54] FIBER AND VITAMIN-FORTIFIED DRINK COMPOSITION AND BEVERAGE AND METHOD OF MAKING

[75] Inventors: Suresh B. Kota, Cupertino, Calif.; Bei Zhang, Fairfax; Tommy Chau, Ashburn, both of Va.; Robert K. Yang, Flushing, N.Y.; Subraman R. Cherukuri, Vienna; Abhijit Banerjee, Alexandria, both of Va.

[73] Assignee: Fuisz Technologies Ltd., Chantilly, Va.

[21] Appl. No.: 09/140,380

[22] Filed: Aug. 26, 1998

[51] Int. Cl.$^6$ ........................................... A23L 2/00
[52] U.S. Cl. ................ 426/590; 426/72; 426/74; 426/78; 426/443; 426/573; 426/599; 426/658
[58] Field of Search ................ 426/72, 74, 443, 426/78, 573, 590, 599, 658

[56] References Cited

U.S. PATENT DOCUMENTS

| | | | |
|---|---|---|---|
| 5,236,734 | 8/1993 | Fuisz | 426/641 |
| 5,238,696 | 8/1993 | Fuisz | 426/565 |
| 5,380,473 | 1/1995 | Bogue et al. | 264/11 |
| 5,387,431 | 2/1995 | Fuisz | 426/658 |
| 5,427,811 | 6/1995 | Fuisz et al. | 426/465 |
| 5,429,836 | 7/1995 | Fuisz | 426/601 |
| 5,445,769 | 8/1995 | Rutkowski et al. | 264/8 |
| 5,447,423 | 9/1995 | Fuisz et al. | 425/9 |
| 5,458,823 | 10/1995 | Perkins et al. | 264/8 |
| 5,518,730 | 5/1996 | Fuisz | 424/426 |
| 5,582,855 | 12/1996 | Cherukuri et al. | 426/5 |

*Primary Examiner*—Helen Pratt
*Attorney, Agent, or Firm*—John F. Lewis

[57] ABSTRACT

A beverage composition has a source of fiber, as well as one or more additional nutrients. The composition is in the form of a shearform matrix as a result of flash-flow processing. The beverage composition is highly storage stable.

16 Claims, No Drawings

FIBER AND VITAMIN-FORTIFIED DRINK COMPOSITION AND BEVERAGE AND METHOD OF MAKING

FIELD OF THE INVENTION

The present invention relates to beverages containing edible fiber, and more particularly, to an improved fiber drink mix and beverage fortified with nutrients, in particular vitamins.

BACKGROUND OF THE INVENTION

Fiber from both soluble and insoluble sources is now well recognized as a necessary "nutrient" in a healthy diet. In particular, it is now widely believed that a diet rich in fiber from many sources may be instrumental in preventing the development of many types of diseases. Colon cancer, for example, is viewed as highly preventable through maintenance of a fiber-rich diet. The U.S. Recommended Daily Allowance (RDA) of dietary fiber is approximately 25 grams daily for the average adult. Unfortunately, as is the case with most nutrients, many people do not ingest nearly enough roughage to meet even this minimum level. This is because most people do not consume enough of some of the most common sources of fiber, namely fresh fruits and vegetables.

Commercially available supplements have been on the market for quite some time for people who are deficient in their ingestion of roughage. Examples of these preparations include dry beverage drink mixes that yield a sweet-tasting, fruit-flavored liquid when combined with water. These drink mixes too often induce a laxative effect, however, producing maximum effect within a relatively short time period. Once an individual's temporary constipation is relieved, the product is no longer suitable for regular daily consumption. Other products are simply unpalatable with relatively poor organoleptic characteristics. Some of these do not mix well with water or any liquid, leaving bits or even chunks of gritty material suspended in solution. Some others have what has been described as an off-taste. Ingesting these is like swallowing a mouthful of sand and water. Still other formulations, in their attempt to mask the fiber, produce a mix which yields a liquid that is far too slimy or too thin and runny. Individuals thereby forego a sound regimen of fiber consumption due to the unpleasant nature of many of today's products.

The problem therefore exists of formulating a suitable fiber-rich drink which is pleasant and agreeable. Such a beverage should be easy to mix in water and yield a liquid with a substantially grit-free and uniform consistency. The drink should preferably be sweet-tasting. One which provides additional nutrients is even more desirable.

The biggest obstacle to producing such a beverage is the fiber itself. By its very nature, edible fibrous material does not typically dissolve or even mix well in aqueous media. The assignee of the present application has discovered certain unique methods of processing various types of material which have enhanced their solubility in water. Also enhanced is the ability of these ingredients to mix well with one another in a dry state. These "flash flow" processing techniques and apparatus have not been scaled for use with an ingredient such as raw edible fiber, however. The fiber itself presents a unique problem. Fiber particles often tend to be significantly larger than many other types of material processed through a spinning head, thereby greatly increasing the chances for clogging. Fiber particles also tend to attract highly hydroscopic material such as fructose and sorbitol. This in turn further enhances the possibility of clumping as wet globs of material are sent through the processing apparatus. Unlike other types of material which may be flash flow processed in a liquid or semi-liquid state, fiber is typically not well suited to processing in a liquid medium. Thus, flash flow processing of fibrous material has been avoided due to the inherent difficulties associated with the material itself.

SUMMARY OF THE INVENTION

It has now been discovered that edible fiber may be flash-flow processed with other food-grade materials to yield a novel dry beverage mix and drink. When combined with a liquid such as water, the dry mix yields a highly palatable nutritional supplement with a good balance of sweetness and tartness. The novel beverage preferably delivers additional nutrients as well. It is particularly desirable to include up to about 100% of the RDA of many vitamins in the composition.

It is especially preferred that the dry beverage composition of the invention be in the form of a shearform matrix, hereinafter described. Unlike other fiber beverage mixes which are commercially available, the product herein set forth does not clump in water. The ensuing liquid beverage is not gritty and is visually appealing, with minimal or no swirling fiber debris. Shearform matrix attributes result in the quick dissolution of all ingredients in the liquid.

Also provided as part of the invention is a method of providing dietary fiber in shearform matrix which comprises subjecting the fiber to conditions of flash-flow processing, hereinafter described.

DETAILED DESCRIPTION OF THE PREFERRED EMBODIMENTS

The novel fiber drink mix and beverage of the invention comprises a carrier material as one component. This carrier material is utilized to provide support for, or "piggyback", the hereinafter described fiber material during "flash-flow" processing and thereby aid in mixing. Carrier materials are typically chosen from the listing of saccharide materials available in the food industry. These materials will include mono-, di-, tri- and polysaccharide material, either alone or in combination, and their related oligomers. By way of illustration, invert sugar, sucrose, fructose, maltose, dextrose, polydextrose, polydextrin, glucose (corn syrup), maltodextrin (corn syrup solids) etc. are just some examples of suitable carrier material. Of these, maltose, maltodextrin and polydextrose are particularly preferred. The skilled artisan may find that other suitable carrier material, having the characteristics of the saccharide material set forth above, may also be used as carrier material. The carrier component of the composition of the invention will typically constitute about 20–80% thereof, more particularly about 40–75%, and even more desirably about 60–70%.

It is especially preferred to utilize the carrier material in its dry state. Saccharide material combined with water in a liquid or syrup solution is best minimized or avoided. It is also desirable to minimize the presence of highly hydroscopic materials, e.g. fructose and sorbitol, in the carrier material.

Further provided as part of the dry beverage mix of the invention is one or more sources of edible fiber. As that term is used herein, "edible fiber" refers to any source of roughage that is capable of being ingested and processed without harm by animals, in particular man. Fiber from whatever source is therefore suitable, especially plant matter, such as bran from oats, wheat, corn and rice etc., as well as cellulosic material. Husk material may also be preferred. The term "fiber" encompasses what is referred to by the skilled artisan as both "soluble" and "insoluble" fiber. The fiber component of the invention will typically be present in the composition of the invention in quantities chosen by those in the industry to deliver a certain percentage of RDA within a suitable serving size when combined with a liquid. As a general rule, the amount of fiber should be within the range of about 0.1–20% of the dry weight of the composition. It is especially preferred to utilize fiber within the range of about 10–20%. Unlike with many other raw ingredients that are capable of undergoing the procedure known in the art as flash-flow processing (hereinafter described), it has now been discovered that a maximum loading of fiber in excess of about 20% by weight should preferably be avoided.

Fiber can be especially troublesome to process into a dry beverage mix because of its tendency to clump and adhere to other materials during mixing. To avoid this problem, it is highly desirable to utilize fiber which is 60 mesh or smaller. Preferably, at least about 80% of the fiber should be capable of passing through a 40 mesh screen. Unlike with many other food-grade materials which are currently flash-flow processed in the art, it has now been discovered that at least in certain embodiments the size of the fiber particles being processed should preferably be as small and unobtrusive as possible.

An additional component in the composition according to its various embodiments will be some type of food processing aid which will assist in binding all components together, and thereby ensure final product texture, consistency and excellent dispersability in aqueous media. Proteinaceous material such as gelatins may be useful. Also contemplated are food grade gums such as gum arabic, carrageenan, guar gum, and locust bean gum. Mixtures of any of the foregoing processing aids are also within the scope herein described. Other processing aids include substances selected from the group consisting of materials typically referred to as phophatides or phospholipids. Other food processing aids include those with desirable wetting, lubricating, emulsifying or penetrating properties. Of these, lecithin, either alone or in combination with one or more gums or gelatins may be desirable. Other desirable food processing aids are those with gelling or swelling characteristics. Pectin is a naturally derived water-soluble carbohydrate, obtained from certain ripe fruits, and is generally regarded as an excellent gelling agent. One or more of these food processing aid(s) will comprise about 0.1 to 40% of the composition, and even more preferably will be in the range of about 1 to 25% of the composition. It may even be especially desirable to have 10 to 20% of a processing aid in some embodiments. A lubricating adjuvant (as a processing aid) can typically comprise about 1–7% of the composition.

Further provided as part of the dry beverage mix of the invention are one or more sweeteners. These sweeteners can be chosen from the listing of saccharide material available to the skilled artisan as the carrier component, or can be different materials from those comprising the carrier material, heretofore described. The sweetener is added primarily to provide the composition of the invention with a palatable sweet taste and flavor. Sweeteners can include mono-, di-, tri- and polysaccharide materials, either alone or in combination, and their related oligomers. Invert sugar, sucrose, fructose, maltose, dextrose, polydextrose, polydextrin, glucose (corn syrup), maltodextrin (corn syrup solids) etc. are just some examples of suitable sweeteners. Other highly suitable sweeteners include saccharin, aspartame, acesulfame, sucralose, sorbitol, mannitol, maltitol, xylitol as well as other commercially available sweeteners such as the dihydrochalcone compounds, glycyrrhizin, Stevia Rebaudiana (Stevioside), and the hydrogenated starch hydrolysates. Other sweeteners contemplated by the skilled artisan which are typically utilized in the beverage industry may also be used. The sweeteners are added in amounts equal to about 0–10% of the composition, and preferably within the range of about 0.1–5%. More preferably, the sweeteners will comprise about 0.1–2% of the final dry drink mix formulation.

Flavoring agents are also desirably included as part of the dry beverage formulation of the invention. These are typically utilized to provide the taste and essence of many naturally derived fruit drinks. Other flavorings may be chosen to impart tartness or acidity to the final composition. Any number of flavorings can be utilized (in whatever form), and can be chosen from suitable natural and synthetic flavoring liquids and powders, etc. An illustrative list of such agents includes volatile oils, synthetic flavor oils, flavoring aromatics, oils, liquids, powders, oleoresins or extracts derived from plants, leaves, flowers, fruits, stems and combination thereof. A non-limiting representative list of examples includes citrus oils such as lemon, orange, grape, lime, and grapefruit, as well as fruit essences including, for example, apple, pear, peach, grape, strawberry, raspberry, cherry, plum, pineapple, apricot, or other fruit flavors. Other useful flavorings include, for example, aldehydes and esters such as benzaldehyde (cherry, almond), citralm, i.e., alpha-citral (lemon, lime), neural, i.e., betacitral (lemon, lime) decanal (orange, lemon), aldehyde C8 (citrus fruits), aldehyde $C_9$ (citrus fruits), aldehyde $C_{12}$ (citrus fruits), tolyl aldehyde (cherry, almond), 2,6-dimethyloctanal (green fruit), and 2-dodecenal (citrus, mandarin), mixtures thereof, and the like. Chocolate, vanilla and cream flavorings, from whatever derived source, may also be include as the flavoring agent herein.

In one especially preferred formulation of the invention, e.g. an orange-flavored beverage mix, orange flavoring and orange oil are utilized as an important flavoring component. Overall, flavorings may generally be included in the dry beverage formulation of the invention in amounts equal to about 0 to 20% by weight. It is especially desirable that flavorings comprise about 0.1 to 5% of the final dry formulation.

Additional food-based substances can also be employed in the composition of the invention. Food grade fats or oils and other oleaginous materials, for flavor and/or texture enhancement, can also comprise a component thereof. As an example, an edible oil may be utilized to provide encapsulation means for the fiber or other nutrients, hereinafter described. These optional ingredients, either alone or in combination, can typically be included as part of the dry beverage composition in amounts equal to about 0 to 10% by weight, and more desirably within the range of about 0.01 to 2%.

Coloring agents may also be included as part of the novel composition of the invention. Naturally and synthetically food dyes can make up from about 0 to 1%, more preferably about 0.01 to 0.5 of the final composition. Annatto may be especially preferred in certain embodiments.

In addition to the source of fiber, it is also highly preferred to include one or more additional nutrients or nutritional supplements (including nutraceuticals) as part of the beverage formulation. These may be selected from the group consisting of vitamins, minerals, trace elements, amino acids, etc. in amounts as desired by the skilled artisan. Of these, an edible source of calcium may be particularly desirable. Typically, the quantity of the nutritional supplement(s) will correspond to an amount generally recognized as both safe and effective by the United States Food & Drug Administration as the Recommended Daily Allowance, or RDA (or some fraction thereof). For those supplements for which no RDA has been officially promulgated, then an amount generally accepted in the art as both safe and efficacious may be utilized. On a weight basis as a percentage of the total dry beverage formulation, these additional nutrients can make up from about 0 to 20% thereof, more particularly in the range of about 0.01 to 5% thereof.

In one preferred embodiment of the invention, it is especially desirable to include vitamin C in an orange-flavored beverage, along with the fiber component. A single serving size of dry beverage mix will therefore preferably contain about 60–75 mg. or so of ascorbic acid, or corresponding ester salt thereof, equal to about 100% of the U.S. RDA of vitamin C. The skilled artisan may wish to include more or less of this nutrient.

Another preferred embodiment will include a weight percentage of one or more vitamins and/or minerals and/or other nutrients corresponding to a certain percentage of the U.S. RDA, in addition to vitamin C. Especially preferred vitamins include A, B complex (niacin, B1, B2, B6, B 12) and E. Folic acid is an excellent nutrient to also include in the final formulation. The skilled artisan will find that a fiber beverage which delivers up to 100%, or even more, of fiber and one or more vitamins and other vital nutrients in a single serving is a desirable embodiment for the formulation of the invention.

One or more of these nutrients may be encapsulated or enrobed in oil, fat or other oleaginous material, using methods available in the art. For example, extrusion techniques, e.g. flat-bed extrusion, are well known examples of processing. Other examples may include spray-drying and atomizing, as well as a combination of extrusion methods with other known processing methods. The method and apparatus set forth in U.S. Pat. No. 5,380,473 may also be utilized. In another embodiment, an apparatus and method as that described in Irish Patent Application No. 980395 may be utilized. A processing tower accommodates a dry spray device at an upper end thereof so as to eject a product additive into a free-flow condition. An extruding device, utilizing the method and components described in U.S. Pat. No. 5,380,473, ejects a product encapsulant into the free-flow stream so as to encapsulate the individual particles. The encapsulated particles remain in a free-flow condition where a cooling device is interjected into the tower to cool the encapsulated particles to form the product matrix. In this way, nutrients such as vitamins, minerals, etc. may be encapsulated with an oleaginous substance and thereby be preserved for further processing with the other components constituting the fiber-rich beverage mix of the invention.

The components heretofore described as constituting the fiber-rich beverage composition of the invention are preferably combined and processed through the use of a unique procedure known in the art as "flash-flow processing," which provides a simple and effective method of preparing such compositions. The term "flash-flow" has become recognized as referring to the conditions of temperature and force required to transform a solid feedstock having a certain morphological and/or chemical structure into a new solid having a different morphological and/or chemical structure without subjecting the solids to the excess heat or other requirements inherent in extrusion processing. The resultant structure has now been referred to as a "shearform matrix." The concepts of "flash-flow" and "shearform matrix" are further described, for example, in co-owned U.S. Pat. No. 5,236,734 issued Aug. 17, 1993, and U.S. Pat. No. 5,238,696 issued Aug. 24, 1993, as well as in U.S. Pat. Nos. 5,518,730, 5,387,431, 5,429,836 and 5,582,855.

As indicated above, "flash-flow" processing involves subjecting a feedstock to conditions of temperature and force which induce a solid feedstock to rapidly undergo such physical and/or chemical transformation. The time during which the feedstock material is subjected to temperatures is extremely short. Flash-flow processing can be accomplished either by the more preferred flash heat method or via a flash shear method, as both are described further herein.

In the flash heat process, a shearform matrix can be formed by spinning a feedstock in a "cotton candy" fabricating type machine. The spinning machine used to achieve a flash heat process can be a cotton candy type machine such as the EconoFloss Model 3017 manufactured by Gold Medal Products Company of Cincinnati, Ohio, a machine having a coiled heater element as disclosed in U.S. Pat. No. 5,427,811 and the like.

In particular, a spinning machine developed by Fuisz Technologies Ltd. of Chantilly, Va. and patented under U.S. Pat. No. 5,458,823 may be especially preferred for the flash-heat process. This patent describes a spinning machine which has a series of elongated heating elements arranged in between a base and a cover. The heating elements, base and cover together define a chamber into which a non-solubilized feedstock material is inserted which is capable of intraparticle flow upon application of heat and force. Means are provided for individually heating each of the elongated heating elements, and restriction means in the form of a cylindrical shell or annular plate which circumscribes the heating elements permits restrictive flow of the processed feedstock which is expelled from the chamber.

It will be appreciated by those skilled in the art that any apparatus or physical process which provides similar forces and temperature gradient conditions can also be used. For simplicity in disclosing and describing this invention, the term "flash heat" will be understood to mean a process which includes subjecting a feedstock to the combination of temperature, thermogradients, flow, flow rates, and mechanical forces of the type produced in a candy machine or the above-referenced U.S. No. Pat. 5,427,811, as well as other apparatus having a spinning head, such as that described in U.S. Pat. Nos. 5,445,769, 5,447,423 and 5,458,823 and recently allowed U.S. Ser. No. 08/854,344. The apparatus is operated at the temperature and speed which permits flash heat of the feedstock without deterioration of any of its ingredients, and these parameters can easily be optimized by those skilled in the art.

In the flash heat process, the feedstock material is heated sufficiently to create an internal flow condition, i.e., intra-particle flow, which permits part of the feedstock to move at a subparticle level with respect to the rest of the mass and exit openings provided in the perimeter of the spinning heat. The centrifugal force created in the spinning head flings the flowing feedstock material outwardly from the heat so that it reforms with a changed structure. The force required to discharge flowable feedstock is provided by the forces which result from the spinning head. The flash heat process has been used in many cases to produce an amorphous matrix from a crystalline material, as disclosed in the aforementioned Fuisz patents. In the present invention, the feedstock includes the heretofore described components constituting the dry beverage composition. It is, however, also within the scope of the invention to process some or even one of the aforesaid components using flash-flow (flash heat or flash shear).

In the flash shear process, a shearform matrix is formed by raising the temperature of the feedstock material, which includes a non-solubilized carrier, to a point where the carrier undergoes intra-particle flow. The carrier component is preferably a saccharide-based material. The feedstock is advanced and ejected from an extruder or similar type of machinery while the carrier is undergoing intra-particle flow and is then subjected to disruptive fluid shear forces to form multiple parts or masses.

The flash shear process can be carried out in an apparatus which has means for increasing the temperature of a non-solubilized feedstock and means for simultaneously advancing it for ejection. A multiple heating zone twin extruder can be used for increasing the temperature and advancing material feedstock. The apparatus includes a means for ejecting the feedstock in a condition for shearing it to provide the shearform matrix. The means for ejecting is in fluid communication with the means for increasing the temperature and is arranged at the point to receive the feedstock while it is in the internal flow condition. The means for ejecting the feedstock is preferably a nozzle which provides sufficient frictional gas force applied to the ejected feedstock stream to disrupt the stream and form shearform masses.

An apparatus for flash shear processing of the feedstock is described in U.S. Pat. No. 5,380,473. The means for shearing is arranged proximally to the ejector and is disposed to effect the shear of the feedstock while it is in the internal flow condition. Preferably, the means for shearing is the means for delivering fluid such as at sufficient velocity and at elevated temperature against the feedstock stream as it exists a nozzle. Such a device can be an external atomizing nozzle. The means for shearing can also be a chamber in which the environment can be maintained to induce shear upon the collision of a high velocity of a stream of feedstock directed against a preselected and maintained environment. The individual components of the novel composition herein described may thus be subjected to flash shear processing as well. Those skilled in the art may find that flash-shear methodology and parameters can be further adjusted to their particular needs.

In flash-flow processing, the time during which the feedstock material is subjected to elevated temperature is very short. In the flash-heat method, the feedstock is subjected to elevated temperature usually for only tenths of a second, and in the flash-shear method the feedstock is subjected to elevated temperatures for a time on the order of seconds. This has specific benefits in situations when materials might be degraded or otherwise detrimentally affected by excessive exposure to heat.

Flash-flow processing results in increased surface area and increased solubility of the ingredients subjected thereto, and contributes to actual mixing of the ingredients with each other. These shearform matrix attributes, as they are often referred to, are highly desirable in a final product. To further enhance the development of these matrix characteristics, it is preferred to process all or most of the ingredients constituting the fiber beverage mix in their dry, non-aqueous state. This advance is unheralded in the art, which has traditionally utilized some copious amounts of water, oil or syrup solutions to bind all major ingredients. Unfortunately, this results in a mixture which clumps and clogs in the flash-flow processing apparatus. It also produces a dry beverage that when added to water yields a drink which is clumpy and high in unappealing fiber sediment.

As a result of being processed according to the unique procedures known as flash flow, the fiber product of the invention is produced in dry, particulate form. Small granules, flakes, spicules, powders, particles, fiber and floss, etc. are just some of the many forms of the product which can exit the particular flash-flow apparatus, depending upon adjustments made to the operating parameters (including temperature and centrifugal force, as well as the size of the openings in the spinning head). Regardless of the desired form, all ingredients are intimately combined so that no further processing is required. Just as importantly, the shearform matrix material obtained via flash flow dissolves readily, rapidly and substantially completely in a liquid such as, for example, water. This contributes greatly to the organoleptic characteristics of the final beverage. No more gritty chunks of unprocessed fiber need cause consternation to the consumer. Flash flow not only intimately mixes all components, it provides an increase in surface area as well. This, in turn, assists the dry beverage composition in its dissolution in liquid so that a uniform consistency is attained. The consumer need no more gulp down chunky, poorly processed fiber drinks. (It will be appreciated by those skilled in the art that other methods of processing the beverage drink mix of the invention, which yield substantially the same attributes of shearform matrix as can be achieved with flash-flow processing, are also within the scope of the invention.)

The flash flow methods herein described impart another significant and unique advantage to the product of the invention. As a result of flash-flow processing, the dry beverage material is substantially free of moisture, to a significantly greater extent than had the individual components been combined using standard mixing apparatus. The overall effect can not be understated. Excess moisture which is eliminated during the flash flow process can not then be present as a medium within which the components of the composition can react, and thereby render the composition unpalatable during storage. The composition appears to be almost moisture-resistant as a result of flash-flow processing, until it is dissolved in amounts of water sufficient to yield a serving thereof. In contrast to the inventive composition, many fiber-based formulations commercially available today require complex, expensive and too often unreliable air-tight and moisture-resistant packaging to guard against ruination of the beverage mix for extended periods on the shelf. The novel composition of the invention is thus storage stable for a considerably longer time period than many other formulations, even when not housed in air-tight containers. In other words, prolonged exposure to the air will not render the beverage mix herein described unpalatable and unusable.

To prepare the fiber-based, dry beverage mix for consumption, the user will typically dissolve a pre-set amount in an excess of suitable liquid. Preferably, the liquid is at about room temperature or below. Such liquids can include, for example, water or even juice in amounts of from about 2 to 16 ounces, preferably about 4 to 12 ounces, most preferably about 8 ounces. A suitable serving size to be mixed with the liquid can vary according to the particular desires of the skilled artisan, but is usually within the range of about 10–20 grams, preferably about 15 or 16 grams. Volume-based serving sizes, e.g. one or two teaspoons or tablespoons, are also within the scope of the invention.

The particular serving size should preferably contain one or more nutritional supplements as heretofore described corresponding to the particular daily requirement (RDA) or some fraction thereof. A particularly desirable embodiment will comprise about 25%–50% of the RDA of fiber, along with about 100% of the RDA of one or more additional nutrients, such as vitamin C or a multi-vitamin mixture.

In an especially preferred embodiment, the composition of the invention when mixed with water will yield a beverage which has an appearance very similar to that of commercially available orange juices and drinks.

It is also within the scope of the invention that the dry beverage composition herein described be further combined with a suitable liquid (e.g., water), and sold as such in a suitable package, such as a traditional pourable juice-type carton or can typically purchased by the consumer. The dry beverage may also be liquified, and then partially dehydrated and frozen to form a beverage mix capable of reconstitution with additional liquid. The foregoing embodiments are all encompassed by the invention.

The following examples are provided by way of illustration only, and are not to be construed as limiting the scope of the invention:

EXAMPLES

Example 1

A fiber-based dry beverage mix was prepared with components as set forth in TABLE 1 below:

TABLE 1

| Ingredient | Amount |
|---|---|
| Fiber (Psyllium Husk Fine) | 15.7% |
| Locust Bean Gum | 1 |
| Maltose Corn Syrup Solids 65% | 40–60 |
| Guar Gum and Partially Hydrolyzed Guar Gum | 20–21 |
| Gum Arabic | 1 |
| Hydroxylated Lecithin | 2 |
| Orange Flavor Oil (Sunkist) | 2.5 |
| Citric Acid | 2 |
| Pectin | 1 |
| Annatto | 0.05 |
| Aspartame | 0.65 |
| Multi-Vitamin Complex Pre-Mix* | 4.5 |
| Oat Fiber (Snowhite) | 1 |
| Beta-Carotene | 0.2 |

*The Vitamin Complex Pre-Mix contained water-soluble and fat-soluble vitamins, nutrients and calcium, together with about 70–75% by weight of maltose corn syrup solids.

All ingredients were combined and processed in a flash-flow mixer to yield small, light-colored granules. 16 grams was then dissolved in 8 fluid oz. of tap water. The mix dissolved quickly and completely in the liquid. The resulting beverage had a very pleasant orange color and grit-free consistency, very similar to that of commercially available juice drinks. The beverage had a tart, yet sweet taste that was described as delicious and refreshing. No gritty or bitter off-taste was discerned. The beverage delivered 5 grams of dietary fiber and about 110–140% RDA of the following vitamins/nutrients: A, C, D, E, K, niacinamide, biotin, folic acid and B complex (B1, B2, B6 and B12), as well as about 120% RDA of calcium pantothenate.

Comparative Example

The same ingredients as in Example 1 were hand-mixed and combined together in a traditional manner without flash-flow processing. 16 grams of the resultant mixture were then added to 8 fluid oz. of tap water. The mixture dispersed much less readily than that obtained from Example 1, and also clumped upon stirring.

While the invention herein has been described according to various embodiments, it is expected that certain changes or modifications thereto may be effected by those skilled in the art without departing from its true spirit and scope as set forth in the claims and the accompanying specification.

What is claimed is:

1. A beverage composition comprising edible fiber and one or more carrier materials, said composition being in the form of shearform matrix.

2. The beverage composition of claim 1, wherein said fiber is in the form of at least one member selected from the group consisting of soluble and insoluble dietary fiber.

3. The beverage composition of claim 2, wherein said carrier material is at least one member selected from the group consisting of mono-, di-, tri- and polysaccharides.

4. The beverage composition of claim 3, further comprising at least one sweetener.

5. The beverage composition of claim 1, further comprising at least one additional nutrient.

6. The beverage composition of claim 5, wherein said nutrient is at least one member selected from the group consisting of vitamins, minerals and bioaffecting agents.

7. The beverage composition of claim 6, wherein said nutrient is a multi-vitamin complex.

8. The beverage composition of claim 1, further comprising at least one food processing aid.

9. The beverage composition of claim 8, wherein said food processing aid is at least one member selected from the group consisting of food grade gums and oleaginous materials.

10. The beverage composition of claim 9, wherein said food grade gum is selected from the group consisting of gum arabic, carrageenan, guar gum, and locust bean gum.

11. The beverage composition of claim 8, wherein said food processing aid is lecithin.

12. The beverage composition of claim 8, wherein said food processing aid is pectin.

13. The beverage composition of claim 1, further comprising at least one flavorant.

14. The beverage composition of claim 13, where said flavorant is at least one member selected from the group consisting of citrus flavors and oils.

15. The beverage composition of claim 14, wherein said citrus flavor is orange flavor and said citrus oil is orange oil.

16. A method of providing dietary fiber in shearform matrix which comprises subjecting said fiber to flash-flow processing.

* * * * *